(12) United States Patent
Wu et al.

(10) Patent No.: US 11,533,741 B2
(45) Date of Patent: Dec. 20, 2022

(54) UPLINK TRANSMISSION METHOD, TERMINAL, AND NETWORK SIDE DEVICE

(71) Applicant: HUAWEI TECHNOLOGIES CO., LTD., Guangdong (CN)

(72) Inventors: Yiqun Wu, Shanghai (CN); Xiuqiang Xu, Shanghai (CN); Yan Chen, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 180 days.

(21) Appl. No.: 16/441,575

(22) Filed: Jun. 14, 2019

(65) Prior Publication Data

US 2019/0297635 A1 Sep. 26, 2019

Related U.S. Application Data

(63) Continuation of application No. PCT/CN2017/115775, filed on Dec. 13, 2017.

(30) Foreign Application Priority Data

Jan. 9, 2017 (CN) .......................... 201710015087.3

(51) Int. Cl.
*H04W 72/12* (2009.01)
*H04W 72/04* (2009.01)
*H04W 88/02* (2009.01)

(52) U.S. Cl.
CPC ....... *H04W 72/1268* (2013.01); *H04W 72/04* (2013.01); *H04W 72/12* (2013.01); *H04W 72/1284* (2013.01); *H04W 88/02* (2013.01)

(58) Field of Classification Search
None
See application file for complete search history.

(56) References Cited

U.S. PATENT DOCUMENTS

2010/0037113 A1* 2/2010 Maheshwari ......... H04L 1/1896
714/748
2011/0119552 A1* 5/2011 Park .................. H03M 13/2975
714/751

(Continued)

FOREIGN PATENT DOCUMENTS

CN 101272602 A 9/2008
CN 104838713 A 8/2015

(Continued)

OTHER PUBLICATIONS

Huawei, HiSilicon, The retransmission and HARQ schemes for grant-free. 3GPP TSG RAN WG1 Meeting #86bis, Lisbon, Portugal, Oct 10-14, 2016, R1-1608859, 5 pages.

(Continued)

*Primary Examiner* — Nicholas Sloms
(74) *Attorney, Agent, or Firm* — Womble Bond Dickinson (US) LLP (57) ABSTRACT

The disclosure provides an uplink transmission method, a terminal, and a network side device. The method includes: pre-allocating, by a network side device, an uplink transmission time-frequency resource to a terminal, and storing, by the terminal, the uplink transmission resource; and when the terminal needs to send a data packet, sending, by the terminal, the data packet to the network side device by using the uplink transmission resource, where the data packet includes indication information, the indication information is used to indicate whether the data packet is initially transmitted by the terminal or the data packet is retransmitted by the terminal, and the network side device can correctly receive the data packet and perform combination processing on the data packet based on the indication information. According to embodiments of the disclosure, reliability of grant-free transmission can be ensured, and communication performance can be effectively improved.

5 Claims, 6 Drawing Sheets

(56) References Cited

U.S. PATENT DOCUMENTS

| | | | |
|---|---|---|---|
| 2014/0192767 A1 | 7/2014 | Au et al. | |
| 2014/0226613 A1* | 8/2014 | Kim | H04L 1/1896 370/329 |
| 2015/0043434 A1* | 2/2015 | Yamada | H04W 72/0446 370/329 |
| 2015/0043489 A1* | 2/2015 | Tseng | H04W 24/02 370/329 |
| 2015/0327245 A1 | 11/2015 | Zhu et al. | |
| 2016/0164643 A1* | 6/2016 | Loehr | H04L 1/1854 370/336 |
| 2016/0352454 A1 | 12/2016 | Zhang et al. | |
| 2016/0366704 A1 | 12/2016 | Lee et al. | |
| 2017/0215171 A1* | 7/2017 | Sun | H04W 72/1284 |
| 2017/0295584 A1* | 10/2017 | Uchino | H04L 1/1819 |
| 2018/0145798 A1* | 5/2018 | Suzuki | H04L 43/0864 |
| 2018/0352464 A1 | 12/2018 | Zhou | |
| 2019/0037598 A1* | 1/2019 | Hamidi-Sepehr | H04W 72/0413 |
| 2020/0068606 A1* | 2/2020 | Zhang | H04L 5/0033 |
| 2020/0244406 A1* | 7/2020 | Lee | H04L 5/001 |

FOREIGN PATENT DOCUMENTS

| | | |
|---|---|---|
| CN | 105722234 A | 6/2016 |
| CN | 107889231 A | 4/2018 |
| WO | 2018090861 A1 | 5/2018 |

OTHER PUBLICATIONS

3GPP TS 36.211 V14.1.0 (Dec. 2016);3rd Generation Partnership Project;Technical Specification Group Radio Access Network;Evolved Universal Terrestrial Radio Access (E-UTRA);Physical channels and modulation(Release 14);total 175 pages.

3GPP TS 36.212 V14.1.1 (Jan. 2017);3rd Generation Partnership Project;Technical Specification Group Radio Access Network;Evolved Universal Terrestrial Radio Access (E-UTRA);Multiplexing and channel coding(Release 14);total 149 pages.

Lenovo,"Discussion on retransmission design for grant-free based UL transmission",3GPP TSG RAN WG1 Meeting #86bis R1-1609400, Lisbon, Portugal Oct. 10-14, 2016,total 3 pages.

Panasonic:"Remaining issueson Persistent scheduling", 3GPP TSG RAN WG2 #62bis, R2-083311, derived from R2-082228 and R2-082229, Jun. 30-Jul. 4, 2008. Warsaw, Poland. XP050140723, total 4 pages.

Ericsson: "Skip padding option for UL grants", 3GPP TSG-RAN WG2 #93 bis, R2-162782, Dubrovnik,Croatia, Apr. 11-15, 2016. XP051082550, total 5 pages.

* cited by examiner

(a) Reference signal pattern of a process 0     (b) Reference signal pattern of a process 1

FIG. 12

UPLINK TRANSMISSION METHOD, TERMINAL, AND NETWORK SIDE DEVICE

CROSS-REFERENCE TO RELATED APPLICATIONS

The disclosure is a continuation of International Application No. PCT/CN2017/115775, filed on Dec. 13, 2017, which claims priority to Chinese Patent Application No. 201710015087.3 filed on Jan. 9, 2017. The disclosures of all of the aforementioned patent applications are hereby incorporated by reference in their entireties.

TECHNICAL FIELD

The disclosure relates to the field of wireless communications technologies, and in particular, to an uplink transmission method, a terminal, and a network side device.

BACKGROUND

In a wireless cellular network system such as a Long Term Evolution (LTE) system, before sending uplink data, a terminal needs to first establish a radio resource control (RRC) connection to a base station to enter a radio resource control connected mode, and then send a scheduling request (SR) to the base station. If the base station allows the terminal to send the uplink data, the base station sends a grant instruction to the terminal. The terminal can send the uplink data to the base station based on a requirement of the instruction only after receiving the grant instruction. Such an uplink data sending method is referred to as grant-based transmission.

Grant-based transmission has two disadvantages. One disadvantage is that a latency is relatively large. The latency herein is a latency from a moment at which the terminal determines that uplink data needs to be sent to a moment at which the terminal sends the data through an air interface. The other disadvantage is that when a very large quantity of terminals need to send uplink data in a specific period of time, a very large quantity of uplink and downlink control channel resources are consumed for sending a scheduling request and grant, thereby resulting in a relatively high proportion of control overheads to total network overheads (for example, power and air interface resources). This disadvantage of the grant-based transmission is particularly evident when all services of the terminal are small data packet services.

A basic idea of grant-free (GF) transmission is that data is received and sent without a grant. To be specific, when the terminal determines that uplink data needs to be sent, the terminal directly processes the data and then sends the processed data to the base station without a need to send an uplink scheduling request and wait to receive a grant from the base station. In comparison with a grant-based transmission solution in which a base station needs to perform scheduling, in the grant-free transmission, there is no need to send an uplink scheduling request and wait to receive a grant from the base station, so that a transmission latency can be shortened and a latency requirement can be met.

For use of GF transmission, using retransmission to improve transmission reliability needs to be considered.

A possible retransmission manner is based on an ACK/NACK feedback: After sending data information to the base station on a GF time-frequency resource, the terminal waits for a feedback from the base station on the data packet. If the terminal receives a NACK feedback or receives no ACK feedback, and the data packet does not expire, the terminal retransmits the data information, to increase a possibility of correctly receiving the data packet by the base station.

Another possible retransmission manner is not based on an ACK/NACK feedback: After sending data information to the base station on a GF time-frequency resource, the terminal retransmits the data packet on a next available GF time-frequency resource until an ACK from the base station is received or the data packet expires.

However, the inventor finds that for GF transmission, retransmitted data cannot be correctly received and processed by the base station. Consequently, reliability of grant-free transmission cannot be ensured.

SUMMARY

The disclosure describes an uplink transmission method, a terminal, and a network side device.

According to one aspect, an embodiment of the disclosure provides an uplink transmission method, including: pre-allocating, by a network side device, an uplink transmission time-frequency resource to a terminal, and storing, by the terminal, the uplink transmission resource allocated by the network side device to the terminal; and when the terminal needs to send a data packet, sending, by the terminal, the data packet to the network side device by using the uplink transmission resource, where the data packet includes indication information, the indication information is used to indicate whether the data packet is initially transmitted by the terminal or the data packet is retransmitted by the terminal, and the network side device can correctly receive and perform combining processing on the data packet based on the indication information, to improve reliability of uplink grant-free transmission.

Herein, that the terminal stores the uplink transmission time-frequency resource pre-allocated by the network side device to the terminal usually means that the network side device pre-allocates and notifies a plurality of transmission resources to the terminal device, so that when the terminal needs to send a data packet, the terminal directly uses the transmission resource without a need to request allocation from the network side device each time, to reduce a latency. A specific implementation scenario is, for example, grant-free transmission or semi-persistent scheduling.

The indication information herein is sent to the network side device by using control information, or is implicitly indicated by using a reference signal. The indication information includes several types of parameters. One type of parameter indicates whether currently transmitted data information is initially transmitted or retransmitted; another type of parameter indicates whether currently transmitted data information is synchronously retransmitted or asynchronously retransmitted; still another type of parameter indicates whether current retransmission is adaptive retransmission or non-adaptive retransmission; and yet another type of parameter indicates whether next time of retransmission of the terminal is grant-based transmission or grant-free transmission.

In a possible implementation, a quantity of slots of an interval between the initially transmitted data packet and the retransmitted data packet is any value. During such adaptive retransmission, a manner of indicating initially transmitted and retransmitted information by using indication information in the disclosure is also applicable.

In a possible implementation, the indication information includes one or more of the following parameters: a hybrid automatic repeat request (HARQ) process identity (ID), a new data indicator (NDI), a resource block assignment (RBA) indicator, a redundancy version (RV), and a buffer status report (BSR).

In the implementation that the indication information is carried in the control information, different values assigned to each parameter represent different transmission statuses.

Different values used for the HARQ process ID represent different HARQ processes. For example, a value 0 assigned to the HARQ process ID represents that the terminal transmits data in a process HARQ 0; and a value 1 assigned to the HARQ process ID represents that the terminal transmits data in a process HARQ 1.

Alternatively, different values used for the NDI represent an initially transmitted data packet or a retransmitted data packet. For example, a value 0 assigned to the NDI represents an initially transmitted data packet, and a value 1 assigned to the NDI represents a retransmitted data packet; or a value 1 assigned to the NDI represents an initially transmitted data packet, and a value 0 assigned to the NDI represents a retransmitted data packet. Alternatively, when a value of the NDI is not toggled or is the same as a previous value, the value of the NDI represents an initially transmitted data packet; or when a value of the NDI is toggled or is not the same as a previous value, the value of the NDI represents a retransmitted data packet.

Alternatively, different values used for the redundancy version (RV) represent a quantity of retransmission times and an initially transmitted data packet or a retransmitted data packet. For example, a value 0 assigned to the RV represents an initially transmitted data packet, a value 1 assigned to the RV represents a data packet retransmitted for a first time, and a value 2 assigned to the RV represents a data packet retransmitted for a second time. Alternatively, when a value of the RV is not toggled or is the same as a previous value, the value of the RV represents an initially transmitted data packet, or when a value of the RV is toggled or is not the same as a previous value, the value of the RV represents a retransmitted data packet.

Alternatively, different values used for the RBA represent different time-frequency resources used by initially transmitted data and retransmitted data. For example, a value 0 assigned to the RBA represents an initially transmitted data packet, and a value 1 assigned to the RBA represents a retransmitted data packet; or a value 1 assigned to the RBA represents an initially transmitted data packet, and a value 2 assigned to the RBA represents a retransmitted data packet.

Alternatively, different values used for the buffer status report (BSR) represent that a data packet to be sent next time by the terminal is transmitted by using the stored uplink transmission resource, namely, grant-free transmission, or that a data packet to be sent next time by the terminal is transmitted by using an uplink transmission resource allocated by the network side device as re-requested, namely, grant-based transmission. For example, a value 0 assigned to the BSR represents that the data packet to be sent next time is transmitted by using the stored uplink transmission resource, namely, grant-free transmission, and a value 1 assigned to the BSR represents that the data packet to be sent next time is transmitted by using the uplink transmission resource allocated by the network side device as re-requested, namely, grant-based transmission; or a value 1 assigned to the BSR represents that the data packet to be sent next time is transmitted by using the stored uplink transmission resource, namely, grant-free transmission, and a value 0 assigned to the BSR represents that the data packet to be sent next time is transmitted by using the uplink transmission resource allocated by the network side device as re-requested, namely, grant-based transmission. Alternatively, when a value of the BSR is not toggled or is the same as a previous value, the value of the BSR represents that the data packet to be sent next time is transmitted by using the stored uplink transmission resource, namely, grant-free transmission; or when a value of the BSR is toggled or is not the same as a previous value, the value of the BSR represents that the data packet to be sent next time is transmitted by using the uplink transmission resource allocated by the network side device as re-requested, namely, grant-based transmission.

According to the uplink transmission method provided in the disclosure, when the terminal sends the data packet to the network side device, the terminal notifies, by using the indication information, the network side device that the currently transmitted data packet is a retransmitted data packet or an initially transmitted data packet, so that the network side device can correctly receive and effectively combine the initially transmitted data packet and the retransmitted data packet, to improve reliability of grant-free transmission.

According to another aspect, an embodiment of the disclosure provides a terminal. The terminal has a function of implementing behavior of the terminal in the foregoing method design. The function of the terminal may be implemented by hardware including a transceiver and a processor, or may be implemented by executing corresponding software by hardware. The hardware or software includes one or more modules corresponding to the foregoing function. The module may be software and/or hardware.

According to still another aspect, the disclosure provides a terminal, including:

a memory, configured to store an uplink transmission resource allocated by a network side device to the terminal; and a transceiver, configured to: when the terminal needs to send a data packet, send the data packet to the network side device by using the uplink transmission resource stored in the memory, where the data packet includes indication information, and the indication information is used to indicate whether the data packet is initially transmitted by the terminal or the data packet is retransmitted by the terminal.

According to yet another aspect, the disclosure provides a network side device, including:

a transceiver, configured to receive a data packet sent by a terminal to the network side device by using a pre-allocated uplink transmission resource, where the data packet includes indication information, and the indication information is used to indicate whether the data packet is initially transmitted by the terminal or the data packet is retransmitted by the terminal; and a processor, configured to perform combining processing on the data packet based on the indication information.

According to still yet another aspect, an embodiment of the disclosure provides a base station. The base station has a function of implementing behavior of the base station in the foregoing method design. The function may be implemented by hardware, or may be implemented by executing corresponding software by hardware. The hardware or software includes one or more modules corresponding to the foregoing function.

In a possible design, a structure of the base station includes a processor and a transceiver. The processor is configured to support the base station in performing corresponding functions in the foregoing method. The transceiver is configured to support communication between the base station and a terminal, send information or signaling in the foregoing method to the terminal, and receive information or an instruction sent by the base station. The base station may further include a memory, and the memory is configured to: be coupled to the processor, and store a program instruction and data that are necessary for the base station.

According to a further aspect, an embodiment of the disclosure provides a control node. The control node may include a controller/processor, a memory, and a communications unit. The controller/processor may be configured to coordinate resource management and configuration between a plurality of base stations, and may be configured to perform the method of combining data information in the foregoing embodiment. The memory may be configured to store program code and data of the control node. The communications unit is configured to support the control node in communicating with a base station, for example, sending information about a configured resource to the base station.

According to a still further aspect, an embodiment of the disclosure provides a communications system. The system includes the base station and the terminal in the foregoing aspects. In an implementation, the system may further include the control node in the foregoing embodiment.

According to a yet further aspect, an embodiment of the disclosure provides a computer storage medium. The computer storage medium is configured to store a computer software instruction used by the foregoing base station, and the computer software instruction includes a program designed to perform the foregoing aspects.

According to a still yet further aspect, an embodiment of the disclosure provides a computer storage medium. The computer storage medium is configured to store a computer software instruction used by the foregoing terminal, and the computer software instruction includes a program designed to perform the foregoing aspects.

According to the terminal and the network side device provided in the disclosure, when the terminal sends the data packet to the network side device, the terminal notifies, by using the indication information, the network side device that the currently transmitted data packet is a retransmitted data packet or an initially transmitted data packet, so that the network side device can correctly receive and effectively combine the initially transmitted data packet and the retransmitted data packet, to improve reliability of grant-free transmission.

BRIEF DESCRIPTION OF DRAWINGS

To describe embodiments of the disclosure more clearly, the following briefly describes the accompanying drawings required for describing the embodiments. Apparently, the accompanying drawings in the following description show merely some embodiments of the disclosure, and a person of ordinary skill in the art may derive other drawings from these accompanying drawings without creative efforts.

DESCRIPTION OF EMBODIMENTS

The following describes technical solutions in embodiments of the disclosure with reference to the accompanying drawings in the embodiments of the disclosure.

Figure 1:
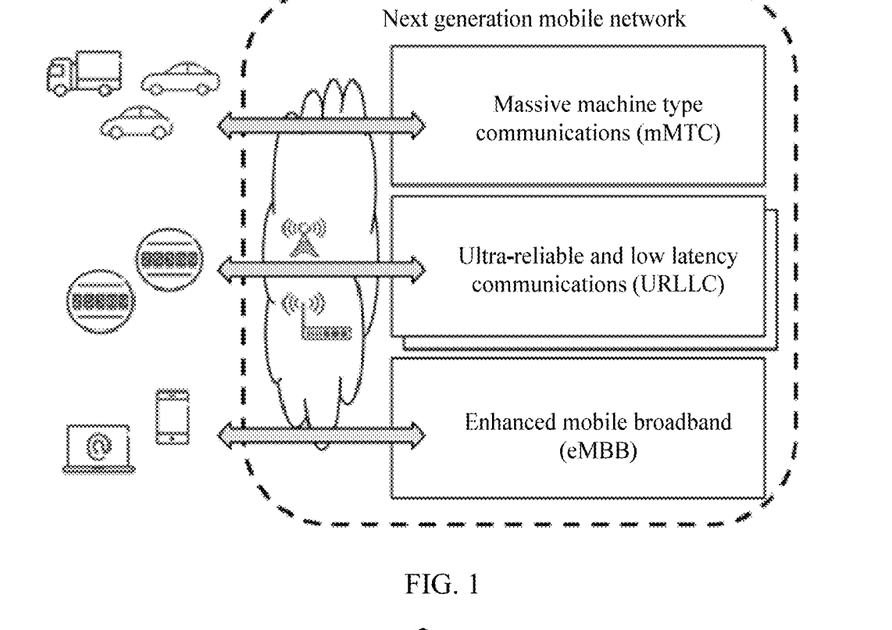
FIG. 1 is a schematic diagram of a scenario of a future network according to an embodiment of the disclosure.

New communication requirements pose challenges to an existing network in terms of technology and business model, and a next generation mobile network (NGMN) needs to meet these requirements. As shown in FIG. 1, main mobile network services of the NGMN are classified into three scenarios: enhanced mobile broadband (eMBB), ultra-reliable and low latency communications (URLLC), and massive machine type communications (mMTC).

The mMTC covers a scenario that has a relatively high requirement for connection density, such as smart city or smart agriculture, to meet a demand of people for a digital society. A typical feature of the scenario is massive connections, to be specific, there is a huge quantity of terminals, service types are mainly small data packet services, and there is a specific requirement for a low latency.

The URLLC focuses on a service that is extremely sensitive to a latency, such as automated driving/assisted driving. For services such as the Internet of Vehicles, unmanned driving, and industrial control, a system capacity is not a main problem, but there is a high requirement for a latency and reliability.

In the foregoing two scenarios, grant-free transmission is considered as a more applicable uplink data transmission method superior to grant-based transmission. In comparison with a grant-based transmission solution in which a base station needs to perform scheduling, in the grant-free transmission, there is no need to send an uplink scheduling request and wait to receive a grant from the base station, so that a transmission latency is greatly shortened and a latency requirement can be met.

In an LTE system, when grant-based transmission is performed, information about a time-frequency resource, and the like used in a retransmission process of a terminal is determined by a base station and then notified to the terminal. Therefore, the base station can correctly receive a data packet in a location of the determined time-frequency resource and process the data packet. Specifically, the base station notifies the time-frequency resource to the terminal by using a physical downlink control channel (PDCCH) or an enhanced physical downlink control channel (EPDCCH), or distinguishes between different hybrid automatic repeat request (HARQ) processes by using a synchronous retransmission method. For uplink GF transmission, the base station may determine, through pre-agreeing or semi-persistent scheduling, a GF resource used by the terminal. However, because the base station does not need to send a grant instruction during grant-free transmission, the GF resource cannot be determined through pre-agreeing or semi-persistent scheduling, and consequently, the base station cannot learn whether a data packet sent by the terminal is an initially transmitted data packet or a retransmitted data packet, and cannot learn whether the terminal uses synchronous retransmission or asynchronous retransmission, or adaptive retransmission or non-adaptive retransmission either. Therefore, retransmitted data cannot be efficiently and effectively processed, and consequently, transmission reliability cannot be ensured.

To ensure reliability of the grant-free transmission in the URLLC and mMTC scenarios mentioned above, an embodiment of the disclosure provides an uplink transmission technology. Certainly, application of technical solutions provided in the disclosure is not limited to only the URLLC and mMTC scenarios. An uplink transmission method, a terminal, and a network side device provided in the disclosure can be applied to any grant-free transmission scenario in which a base station does not need to perform scheduling.

The term grant-free (GF) transmission is used in the disclosure. However, the grant-free transmission may also have another expression manner, for example, grantless transmission. A meaning of the grant-free transmission is not limited thereto in the disclosure. It may be understood that, the grant-free transmission herein is not a special name, and may have another name in actual application, without departing from the essence of the disclosure. The grant-free transmission is usually specific to transmission of an uplink signal, may be understood as one or more of the following meanings, and is not limited to these meanings. For example, the grant-free transmission may alternatively be understood as a combination of some technical features in the following meanings or other similar meanings.

(1) The grant-free transmission may be: A network side device pre-allocates and notifies a plurality of transmission resources to a terminal device; when the terminal device needs to transmit an uplink signal, the terminal device selects at least one transmission resource from the plurality of transmission resources pre-allocated by the network side device, and sends the uplink signal by using the selected transmission resource; and the network side device detects, on one or more of the plurality of pre-allocated transmission resources, the uplink signal sent by the terminal device. The detection may be blind detection, or may be detection performed based on a control field in the uplink signal, or may be detection in another manner.

(2) The grant-free transmission may be: A network side device pre-allocates and notifies a plurality of transmission resources to a terminal device, so that when the terminal device needs to transmit an uplink signal, the terminal device selects at least one transmission resource from the plurality of transmission resources pre-allocated by the network side device, and sends the uplink signal by using the selected transmission resource.

(3) The grant-free transmission may be: Information about a plurality of pre-allocated transmission resources is obtained, at least one transmission resource is selected from the plurality of transmission resources when an uplink signal needs to be transmitted, and the uplink signal is sent by using the selected transmission resource. The information about the plurality of pre-allocated transmission resources may be obtained from the network side device.

(4) The grant-free transmission may be a method in which uplink signal transmission of a terminal device can be implemented without needing dynamic scheduling performed by a network side device, where the dynamic scheduling may be a scheduling manner in which the network side device indicates a transmission resource for each time of uplink signal transmission of the terminal device by using signaling. In one embodiment, implementing the uplink signal transmission of the terminal device may be understood as allowing data of two or more terminal devices to be transmitted on a same time-frequency resource. In one embodiment, the transmission resource may be a transmission resource of one or more transmission time units after a moment at which the terminal device receives the signaling. A transmission time unit may be a minimum time unit of one time of transmission, for example, a TTI (Transmission Time Interval) whose value may be 1 ms, or may be a preset transmission time unit.

(5) The grant-free transmission may be: A terminal device transmits an uplink signal without needing a grant from a network side device. The grant may be: The terminal device sends an uplink scheduling request to the network side device, and after receiving the scheduling request, the network side device sends an uplink grant to the terminal device, where the uplink grant indicates an uplink transmission resource allocated to the terminal device.

(6) The grant-free transmission may be a contention-based transmission manner, and may be specifically: A plurality of terminals simultaneously transmit uplink signals on some or all of pre-allocated same time-frequency resources without needing a grant from a network side device.

(7) The grant-free transmission may be: A network side device specifies, for a terminal, some uplink transmission time-frequency resources dedicated to grant-free uplink signal transmission.

(8) The grant-free transmission may be: A terminal requests a network side device to schedule an uplink transmission time-frequency resource, and after performing uplink transmission by using the uplink transmission time-frequency resource, the terminal retains the uplink transmission time-frequency resource; then, when the terminal needs to perform uplink transmission, the terminal directly uses this part of uplink transmission time-frequency resource without a need to request, each time the terminal performs uplink transmission, the network side device again to schedule an uplink transmission time-frequency resource.

The data may include service data or signaling data.

The blind detection may be understood as detection to be performed, when it is not learned in advance whether there is data to arrive, on data that possibly arrives. The blind detection may alternatively be understood as detection to be performed without indication by using explicit signaling.

The transmission resource may include but is not limited to one or a combination of the following resources:

a time-domain resource such as a radio frame, a subframe, or a symbol;

a frequency-domain resource such as a subcarrier or a resource block;

a space-domain resource such as a transmit antenna or a beam;

a code-domain resource such as a sparse code multiple access (SCMA) codebook, a low density signature (LDS) sequence, and a CDMA code; and an uplink pilot resource.

The technical solutions provided in the disclosure can be applied to the URLLC and mMTC scenarios, but are not limited to only the two scenarios. The uplink transmission method, the terminal, and the network side device provided in the disclosure can be applied to any transmission scenario in which a base station does not need to perform scheduling.

To further describe the uplink grant-free transmission technology provided in this embodiment of the disclosure, a communications system related to the uplink grant-free transmission technology provided in this embodiment of the disclosure is first described herein.

Figure 2:
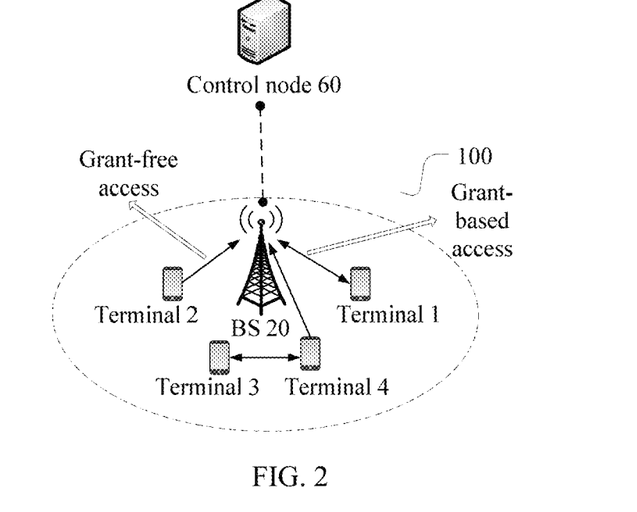
FIG. 2 is a schematic architectural diagram of a communications system according to an embodiment of the disclosure.

As shown in FIG. 2, an embodiment of the disclosure provides a communications system 100. The communications system 100 includes at least one base station (BS) 20 and a plurality of terminals, for example, a terminal 1, a terminal 2, a terminal 3, and a terminal 4. These terminals may be terminals used for device-to-device (D2D) communication, for example, the terminal 3 and the terminal 4, or may be terminals used for cellular communication, for example, the terminal 1, the terminal 2, and the terminal 4. The cellular communication is communication between a terminal and a base station. Certainly, some terminals may not only be used for cellular communication, but may also be used as D2D communications terminals for D2D communication. For example, the terminal 4 may not only be used for cellular communication, but may also be used for D2D communication.

During the cellular communication, the terminal 1 establishes an RRC connection to the BS 20, to enter an RRC connected mode, and then sends an SR to the BS 20. If the BS 20 allows the terminal 1 to send uplink data, the BS 20 sends a grant instruction to the terminal 1. The terminal 1 can send the uplink data to the BS 20 based on a requirement of the instruction only after receiving the grant instruction. Transmission of the uplink data between the terminal 1 and the BS 20 is grant-based transmission.

The terminal 2 establishes an RRC connection to the BS 20, to enter an RRC connected mode, then generates a transmission signal based on an uplink transmission resource allocated by the BS 20 and a corresponding grant-free transmission configuration message, and directly sends uplink data to the BS 20 without a grant from the BS 20. Transmission of the uplink data between the terminal 2 and the BS 20 is grant-free transmission.

In this embodiment of the disclosure, a control node 60 connected to the BS 20 may perform unified scheduling on resources in the system, configure resources for the terminal, make a decision on resource reuse, perform interference coordination, or the like.

In this embodiment of the disclosure, the communications system 100 may be systems with various radio access technologies (RAT), such as a Code Division Multiple Access (CDMA) system, a Time Division Multiple Access (TDMA) system, a Frequency Division Multiple Access (FDMA) system, an orthogonal frequency division multiple access (OFDMA) system, a single carrier frequency division multiple access (single carrier FDMA, SC-FDMA) system, and another system. The term "system" can be interchanged with the term "network". The CDMA system can implement radio technologies such as Universal Terrestrial Radio Access (UTRA) and CDMA2000. The UTRA may include a wideband CDMA (wideband CDMA, WCDMA) technology and another CDMA technology variant. The CDMA2000 can cover Interim Standard (IS) 2000 (IS-2000), IS-95, and IS-856. The TDMA system can implement a radio technology such as a Global System for Mobile Communications (GSM). The OFDMA system can implement radio technologies such as evolved universal terrestrial radio access (evolved UTRA, E-UTRA), Ultra Mobile Broadband (UMB), IEEE 802.11 (Wi-Fi), IEEE 802.16 (WiMAX), IEEE 802.20, and Flash OFDMA. The UTRA and the E-UTRA correspond to UMTS and an evolved release of the UMTS. In 3GPP standards, Long Term Evolution (LTE) and various LTE-based evolved releases are new releases of the UMTS that use E-UTRA.

In addition, the communications system 100 may also be applicable to a future-proofed communications technology. All communications systems using a new communications technology and a cellular communications technology are applicable to the technical solutions provided in this embodiment of the disclosure.

A system architecture and a service scenario that are described in this embodiment of the disclosure are intended to describe the technical solutions in the embodiments of the disclosure more clearly, and do not constitute any limitation on the technical solutions provided in the embodiments of the disclosure. A person of ordinary skill in the art may learn that with evolution of a network architecture and emergence of a new service scenario, the technical solutions provided in the embodiments of the disclosure are also applicable to a similar technical problem.

In this embodiment of the disclosure, the base station is an apparatus that is deployed in a radio access network and that is configured to provide a wireless communication function for a terminal. The base station may include a macro base station, a micro base station (also referred to as a small cell), a relay station, an access point, and the like in various forms. In systems using different radio access technologies, a device having a function of the base station may have different names. For example, in an LTE system, the device is referred to as an evolved NodeB (eNB or eNodeB), and in a 3rd Generation (3G) system, the device is referred to as a NodeB. For ease of description, in all the embodiments of the disclosure, the apparatus providing the wireless communication function for the terminal is collectively referred to as a base station or a BS.

In the communications system shown in FIG. 2, the control node may be connected to a plurality of base stations, and configure resources for a plurality of D2D terminals and cellular terminals that are covered by the plurality of base stations. For example, the base station may be a NodeB in a UMTS system, and the control node may be a network controller. For another example, the base station may be a small cell, and the control node may be a macro base station that covers the small cell. For another example, the control node may be a wireless network inter-RAT coordinated controller, or the like, and the base station is a base station in a wireless network. This is not limited in this embodiment of the disclosure.

Figure 3:
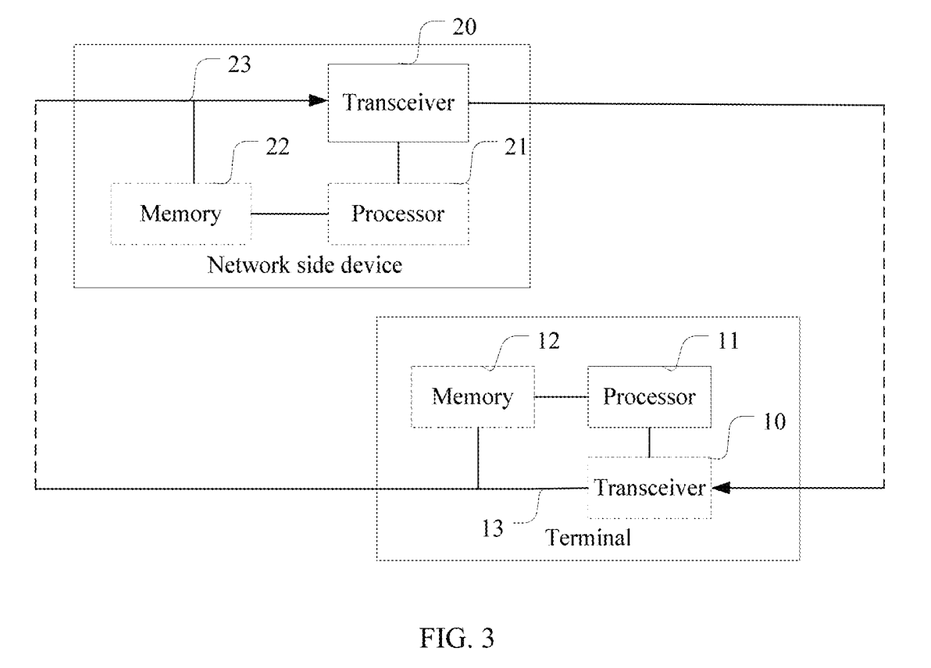
FIG. 3 is a schematic structural diagram of a network side device and a terminal according to an embodiment of the disclosure.

FIG. 3 is a schematic structural diagram of a terminal and a network side device according to an embodiment of the disclosure.

The network side device in this embodiment of the disclosure may include an improved system and device of peer devices in a conventional wireless telecommunications system. Such an advanced or next generation device may be included in an evolved wireless communication standard (for example, Long Term Evolution (LTE)). For example, an LTE system may include an evolved universal terrestrial radio access network (E-UTRAN) NodeB (eNB), a radio access point, or a similar component, instead of a conventional base station. Any component of this type is referred to as an eNB in the disclosure. However, it should be understood that this type of component may not be an eNB. In a next generation communications system, "gNB" is used to replace "eNB" in the LTE system.

Specifically, the network side device may be the BS 20 or the control node 60 in FIG. 2, and the terminal may be one or more of the terminal 1, the terminal 2, or the terminal 3 in FIG. 3.

The terminal provided in this embodiment of the disclosure includes a transceiver 10 and a processor 11, and the terminal may further include a memory 12 and a system bus 13. The memory 12 stores a computer executable instruction, and the system bus 13 is connected to the processor 11, the transceiver 10, the memory 12, and the like. The network side device includes a transceiver 20 and a processor 21, and the network side device may further include a memory 22 and a system bus 23. The memory 22 stores a computer executable instruction, and the system bus 23 is connected to the processor 21, the transceiver 20, the memory 22, and the like. The transceiver 10 of the terminal sends a data packet and corresponding indication information to the transceiver 20 of the network side device by using an antenna. The transceiver 20 of the network side device receives, by using an antenna, the data packet and the corresponding indication information that are sent by the transceiver 10 of the terminal.

It should be noted that, the processor 11 of the terminal and the processor 21 of the network side device may be a central processing unit (CPU), a network processor (NP), or a combination of a CPU and an NP. The processor may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof.

The memory 12 of the terminal and the memory 22 of the network side device may include a volatile memory, for example, a random access memory (RAM), and may alternatively include a nonvolatile memory, for example, a flash memory, a hard disk drive (HDD), or a solid-state drive (SSD). Alternatively, the memory may include a combination of the foregoing types of memories.

The terminal in this embodiment of the disclosure may include various devices having a wireless communication function, such as a handheld device, an in-vehicle device, a wearable device, and a computing device, or another processing device that is connected to a wireless modem. The terminal may also be referred to as a mobile station (MS). The terminal may further include a subscriber unit, a cellular phone, a smartphone, a wireless data card, a personal digital assistant (PDA) computer, a tablet computer, a wireless modem, a handheld device, a laptop computer, a cordless phone or a wireless local loop (WLL) station, a machine type communication (MTC) terminal, and the like. For ease of description, the devices mentioned above are collectively referred to as the terminal in all the embodiments of the disclosure.

To describe a specific implementation process of the uplink transmission method provided in the embodiments of the disclosure in the foregoing communications system, a structure of a data packet sent by using a time-frequency resource during uplink transmission is first described herein.

Figure 4:
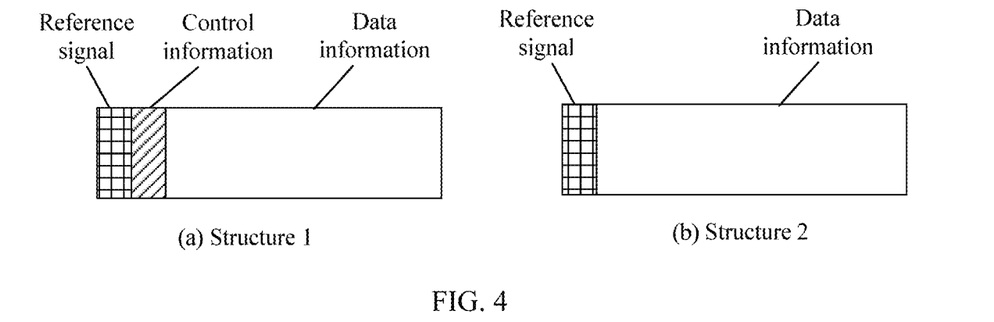
FIG. 4 is a schematic structural diagram of a time-frequency resource used for uplink transmission according to an embodiment of the disclosure.

There are two possible data packet structures during uplink data transmission from a terminal (for example, the terminal 1 and the terminal 2 in the communications system 100 in FIG. 2) to a network side device (for example, the base station BS 20 in FIG. 2), as shown in FIG. 4.

A first type of data packet structure includes three parts: a reference signal (RS,), control information, and data information; and a second type of data packet structure includes two parts: a reference signal and data information. Some data packet structures further include a preamble sequence. However, there is no obvious difference between the preamble sequence and the reference signal in terms of functions, and therefore, the preamble sequence may be considered as one type of reference signal. Regardless of a type of data packet used during uplink transmission, time division multiplexing, or frequency division multiplexing, or both time division multiplexing and frequency division multiplexing may be performed on the control information, the data information, and the reference signal.

To resolve a problem in the uplink transmission, this embodiment of the disclosure provides at least the following two solutions: A first solution is: When a data packet is sent, indication information is carried in control information when data information is sent on a data channel. A second solution is: When a data packet is sent, indication information is implicitly indicated by using a reference signal when data information is sent on a data channel.

The indication information in this embodiment of the disclosure includes several types of parameters. One type of parameter, for example, a new data indicator (NDI) and a redundancy version (RV), indicates whether a currently transmitted data packet is an initially transmitted data packet or a retransmitted data packet. Another type of parameter, for example, a hybrid automatic repeat request (HARQ) process identity (ID), indicates whether a currently transmitted data packet is a synchronously retransmitted data packet or an asynchronously retransmitted data packet. Still another type of parameter, for example, a resource block assignment (RBA) indicator and a buffer status report (BSR), indicates whether a currently transmitted data packet is an adaptively retransmitted data packet or a non-adaptively retransmitted data packet.

Figure 5:
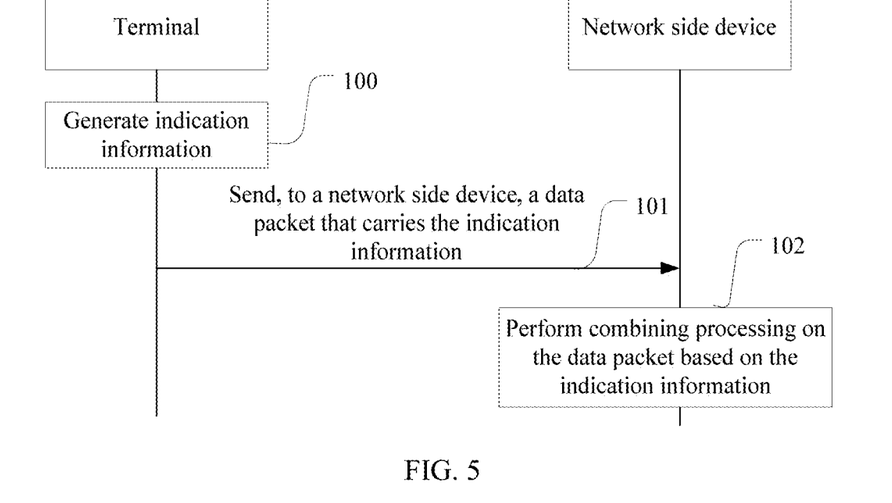
FIG. 5 is a schematic flowchart of an uplink transmission method according to an embodiment of the disclosure.

An uplink grant-free transmission procedure implemented in the communications system in the embodiments shown in FIG. 2 and FIG. 3 is shown in FIG. 5, and includes the following opeartions.

A precondition for the method embodiment is that the terminal stores an uplink transmission resource allocated by the network side device to the terminal.

In other words, in operation 100, a memory 12 of a terminal pre-stores an uplink transmission resource allocated by a network side device to the terminal.

Operation 101: When the terminal performs uplink grant-free transmission, a transceiver 10 of the terminal sends a data packet to the network side device by using the uplink transmission resource stored in the memory 12, where the data packet includes indication information, and the indication information is used to indicate whether the data packet is initially transmitted by the terminal or the data packet is retransmitted by the terminal.

Operation 102: After a transceiver 20 of the network side device receives the data packet sent by the terminal to the network side device by using the pre-allocated uplink transmission resource, a processor 21 of the network side device is configured to perform combination processing on the data packet based on the indication information.

A specific implementation of the uplink transmission method in this embodiment of the disclosure is described in the following different embodiments. It should be noted that the data packet in all the embodiments of the disclosure includes data information transmitted on a data channel, control information transmitted on a control channel, and a reference signal, or may further include a preamble sequence, and the like.

In an implementation in which the indication information is carried in the control information, the control information may be transmitted on an uplink transmission resource that is jointly used by an initially transmitted data packet and a retransmitted data packet.

In addition, synchronous retransmission and asynchronous retransmission are also supported in the embodiments of the disclosure. In other words, a quantity of slots of an interval between initially transmitted data and retransmitted data may be any value. Moreover, combining an initially transmitted data packet and a retransmitted data packet in the embodiments of the disclosure includes chase combining (CC) and incremental redundancy (IR). The CC means that a transport block of a retransmitted data packet and a transport block of an initially transmitted data packet use a same rate matching manner, namely, identical information bits and check bits. The IR combining means that a transport block of a retransmitted data packet and a transport block of an initially transmitted data packet use different rate matching manners, namely, different information bits and check bits. The CC is simple in operation, and the IR combining has an advantage in performance. Different redundancy versions RVs are usually used to distinguish between different rate matching manners.

The following embodiments are described by using an example in which a terminal performs uplink transmission to a base station. Uplink transmission from a terminal to another network side device such as a control node is similar, and details are not described herein.

Embodiment 1

When a terminal performs uplink transmission to a base station, indication information carried in control information includes a HARQ process ID, to resolve a problem of how to combine a plurality of data packets when the plurality of data packets are simultaneously transmitted.

Figure 6:
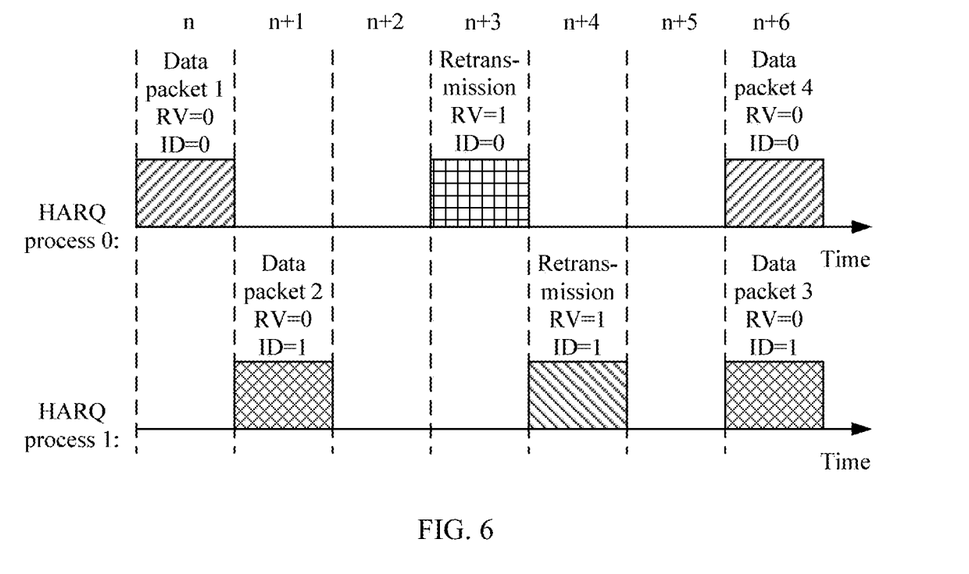
FIG. 6 is a schematic diagram of an uplink transmission method embodiment 1 according to an embodiment of the disclosure.

As shown in FIG. 6, the terminal transmits a first data packet in an $n^{th}$ slot, transmits a second data packet in an $(n+1)^{th}$ slot, retransmits the first data packet in an $(n+3)^{th}$ slot, retransmits the second data packet in an $(n+4)^{th}$ slot, and transmits a third data packet and a fourth data packet in an $(n+6)^{th}$ slot.

The data packets are all transmitted in a GF manner. Data information in the data packets is transmitted on a data channel, control information is transmitted on a control channel, and indication information carried in the control information includes a HARQ process ID, so that the base station determines process IDs corresponding to the data packets. For a same process that has a same ID, the base station may combine an initially transmitted data packet and a retransmitted data packet that are transmitted in the process.

To distinguish between an initially transmitted data packet and a retransmitted data packet, the indication information added by the terminal to the control information further includes a redundancy version (RV). The terminal assigns different values to the redundancy version (RV), to indicate initially transmitted data, retransmitted data, and a quantity of retransmission times. For example, RV=0 indicates an initially transmitted data packet, and RV=1 or that the RV equals another value indicates a retransmitted data packet.

For another example, RV=1 or that the RV equals another value indicates an initially transmitted data packet, and RV=0 indicates a retransmitted data packet. A value of the RV may further indicate a quantity of retransmission times. For example, RV=2 indicates a second time of retransmission, and RV=3 indicates a third time of retransmission. Such an indication manner is merely an example, and there may be another indication manner, for example, a letter is used for indication.

When the base station detects, in the $n^{th}$ slot, that a corresponding bit in the control information indicates ID=0 and RV=0, it indicates that a data packet is an initially transmitted data packet in a HARQ process 0; and when the base station detects, in the $(n+3)^{th}$ slot, that a corresponding bit in the control information indicates ID=0 and RV=1, it indicates that a data packet is a retransmitted data packet in the HARQ process 0. It indicates that the data packet in the $n^{th}$ slot and the data packet in the $(n+3)^{th}$ slot can be combined. Similarly, data packets received by the base station in the $(n+1)^{th}$ slot and the $(n+4)^{th}$ slot can be combined. When the base station simultaneously receives two data packets in the $(n+6)^{th}$ slot, the base station may determine, by using corresponding bits in the control information, HARQ process IDs corresponding to the two data packets.

In another implementation, other different letters are used to represent different HARQ processes, an initially transmitted data packet, and a retransmitted data packet, and these letters are merely an example herein. A manner of indicating a HARQ process, an initially transmitted data packet, and a retransmitted data packet in the embodiments of the disclosure is not limited thereto.

It should be noted that, to support simultaneous transmission of a plurality of data packets, a quantity of HARQ processes may be greater than 2.

According to this embodiment of the disclosure, the indication information including the HARQ process ID and/or the redundancy version (RV) is carried in the control information, so that when receiving a data packet, the base station can accurately parse out a corresponding HARQ process ID from the data packet, and determine which data packet is an initially transmitted data packet and which data packet is a retransmitted data packet, to combine an initially transmitted data packet and a retransmitted data packet in a process corresponding to a same ID, thereby effectively improving a retransmission processing effect, and improving reliability of uplink transmission.

Embodiment 2

When a terminal performs uplink transmission to a base station, indication information carried in control information includes an NDI, to resolve a problem of how to determine an initially transmitted data packet and a retransmitted data packet in a same HARQ process.

As mentioned in Embodiment 1, the RV may be used to distinguish between an initially transmitted data packet and a retransmitted data packet. However, when a CC solution is used, the initially transmitted data packet and the retransmitted data packet use a same RV, and in this case, an NDI needs to be used to indicate the initially transmitted data packet or the retransmitted data packet.

Figure 7:
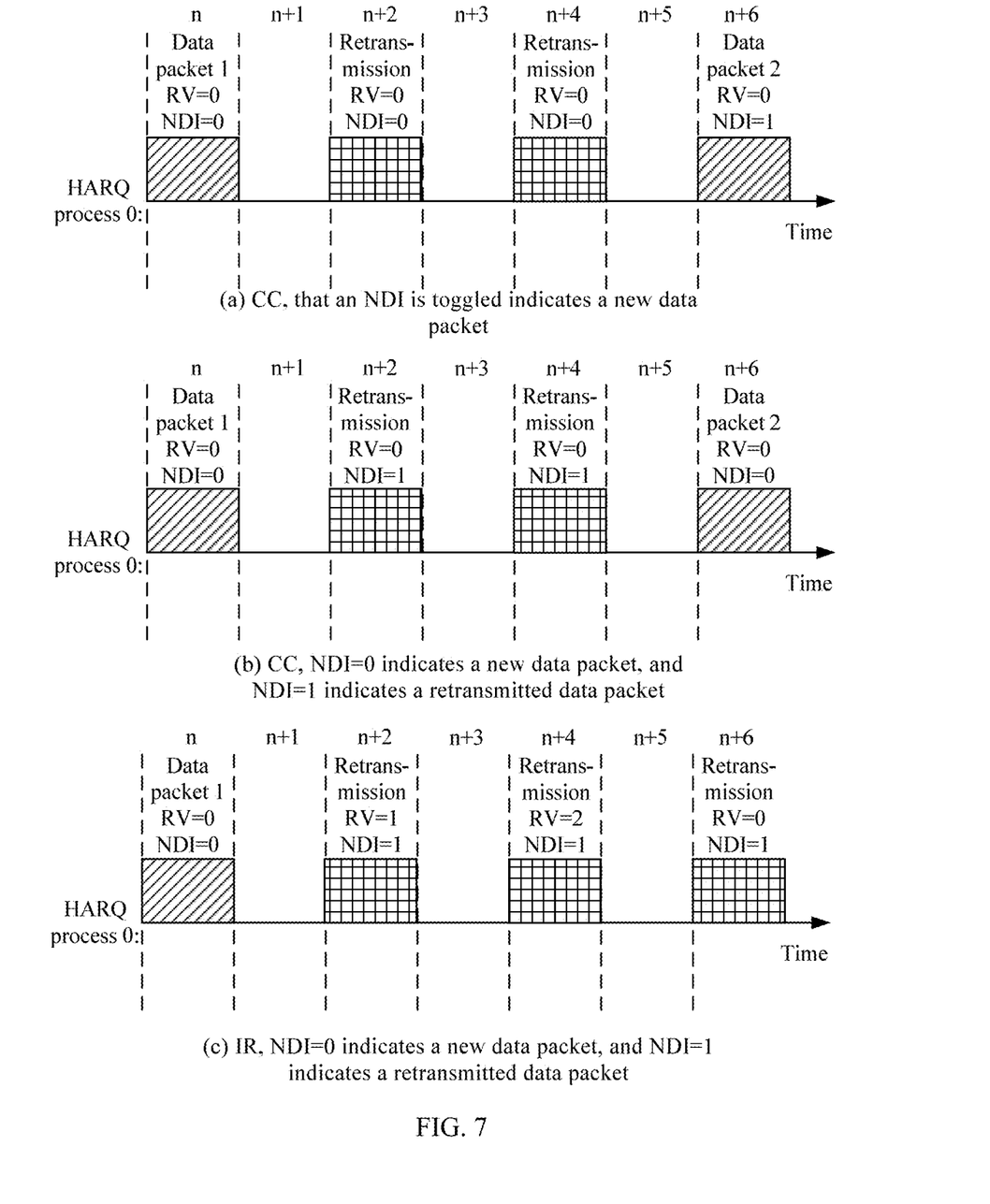
FIG. 7 is a schematic diagram of an uplink transmission method embodiment 2 according to an embodiment of the disclosure.

As shown in FIG. 7, RV=0 is used for both initial transmission and retransmission of a data packet, and an NDI is used to indicate whether the data packet is an initially transmitted data packet or a retransmitted data packet. The NDI has two possible indication manners.

As shown in FIG. 7(a), whether the NDI is toggled may be used to indicate an initially transmitted data packet or a retransmitted data packet. When the NDI changes to 1 from 0 or changes to 0 from 1, it indicates that the data packet is an initially transmitted data packet; or when the NDI does not change, it indicates that a data packet is a retransmitted data packet.

As shown in FIG. 7(b), NDI=0 may be used to indicate that the data packet is an initially transmitted data packet, and NDI=1 may be used to indicate that a data packet is a retransmitted data packet. Alternatively, in another implementation, NDI=1 may be used to indicate that the data packet is an initially transmitted data packet, and NDI=0 is used to indicate that a data packet is a retransmitted data packet. When an IR combining solution is used, if a quantity of retransmission times is relatively large, an initially transmitted data packet and a retransmitted data packet may use a same RV, and in this case, the NDI may also be used to indicate whether the data packet is an initially transmitted data packet or a retransmitted data packet.

As shown in FIG. 7(c), NDI=0 is used to indicate that the data packet is an initially transmitted data packet, and NDI=1 is used to indicate that a data packet is a retransmitted data packet. The base station receives data packets whose RV=0 in both an $n^{th}$ slot and an $(n+6)^{th}$ slot. However, NDI=0 in the $n^{th}$ slot, and NDI=1 in the $(n+6)^{th}$ slot. Therefore, it is determined that a first data packet is an initially transmitted data packet, and a second data packet is a retransmitted data packet. Further, CC or IR combining processing may be performed on an initially transmitted data packet and a retransmitted data packet in a same HARQ process. In another implementation, NDI=1 may alternatively be used to indicate that the data packet is an initially transmitted data packet, and NDI=0 is used to indicate that a data packet is a retransmitted data packet. Alternatively, other different letters are used to indicate an initially transmitted data packet or a retransmitted data packet. For example, NDI=a is used to indicate that the data packet is an initially transmitted data packet, and NDI=b is used to indicate that a data packet is a retransmitted data packet. Such an indication manner is merely an example herein, and a manner of indicating an initially transmitted data packet and a retransmitted data packet in this embodiment of the disclosure is not limited thereto.

According to this embodiment of the disclosure, the indication information including the HARQ process ID, the NDI, and/or the RV is carried in the control information, so that when receiving a data packet, the base station can accurately parse out a corresponding NDI from the data packet, and determine which data packet is an initially transmitted data packet and which data packet is a retransmitted data packet, to combine an initially transmitted data packet and a retransmitted data packet in a process corresponding to a same ID, thereby effectively improving a retransmission processing effect, and improving reliability of GF transmission.

Embodiment 3

When a terminal performs uplink transmission to a base station, indication information carried in control information includes an RBA, and the RBA indicates a size and a location of a time-frequency resource, to facilitate adaptive retransmission.

Figure 8:
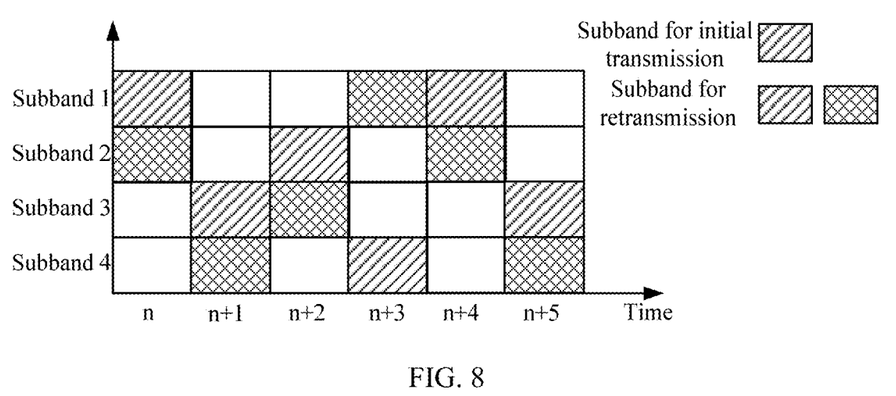
FIG. 8 is a schematic diagram of an uplink transmission method embodiment 3 according to an embodiment of the disclosure.

The terminal may use different or same transmission bandwidth during initial transmission and retransmission. As shown in FIG. 8, each slot has two possible transmission bandwidth configurations. One configuration is a single subband, and the other configuration is two subbands. The single subband is used during initial transmission, and the two subbands are used during retransmission. One of the subbands is used during both initial transmission and retransmission. In other words, some uplink transmission resources are used during both initial transmission and retransmission. Therefore, the control information can be transmitted on the uplink transmission resource used during both initial transmission and retransmission, namely, transmitted on an overlapping subband of the subband for initial transmission and the subband for retransmission, to facilitate detection performed by the base station.

Figure 9:
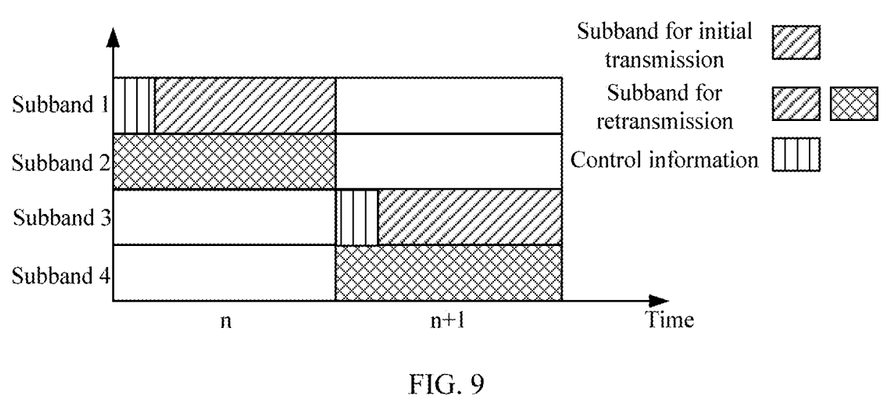
FIG. 9 is another schematic diagram of an uplink transmission method embodiment 3 according to an embodiment of the disclosure.

As shown in FIG. 9, the terminal sends the control information on the overlapping subband of the subband for initial transmission and the subband for retransmission. The base station may first detect an RBA indicator carried in the control information, and determine whether a currently transmitted data packet is an initially transmitted data packet or a retransmitted data packet. If the RBA indicates that the currently transmitted data packet uses a single subband, the base station determines that the currently transmitted data packet is an initially transmitted data packet; or if the RBA indicates that the currently transmitted data packet uses two subbands, the base station determines that the currently transmitted data packet is a retransmitted data packet. Then, the base station detects data information on a corresponding time-frequency resource according to a correspondence between a subband and a time-frequency resource. When the transmission bandwidth includes a plurality of subbands, same data information may be transmitted on different subbands. When detecting the data information, the base station may perform CC on the data information. Alternatively, the terminal may transmit data information including different redundancy versions on a data channel, and the base station performs IR combining on the data information including different redundancy versions when detecting the data information.

In addition, there may be a fixed correspondence between a quantity of retransmission times and transmission bandwidth used when the terminal performs uplink transmission, and a current quantity of retransmission times may be indicated by using an RV carried in the control information or another indication message, so that the base station can determine transmission bandwidth in a current slot and a corresponding time-frequency resource of the terminal. As shown in FIG. 9, the terminal adds a quantity of retransmission times to the control information, and the base station determines transmission bandwidth according to the correspondence between a quantity of retransmission times and transmission bandwidth in Table 1, and detects a data packet on corresponding bandwidth based on the transmission bandwidth.

TABLE 1

| Correspondence between a quantity of retransmission times and transmission bandwidth | | | | |
|---|---|---|---|---|
| Quantity of retransmission times | 1 | 2 | 3 | 4 |
| Transmission bandwidth | 1 | 1 | 2 | 2 |

The values in Table 1 are merely an example, the correspondence between a quantity of retransmission times and transmission bandwidth may also be indicated in another manner, and details are not described herein.

According to Embodiment 3, the indication information carried in the control information includes the RBA, and the RBA indicates, to the base station, a size and a location of a time-frequency resource used by a data packet currently sent by the terminal, so that the base station can conveniently determine, based on the size of the time-frequency resource (namely, a quantity of subbands), whether current transmission is retransmission or initial transmission, and receive the data packet in the indicated location of the time-frequency resource.

Embodiment 4

When a terminal performs uplink transmission to a base station, indication information carried in control information includes a BSR, and the BSR is used to indicate, to the base station, whether the terminal is switched to grant-based transmission from GF transmission.

Figure 10:
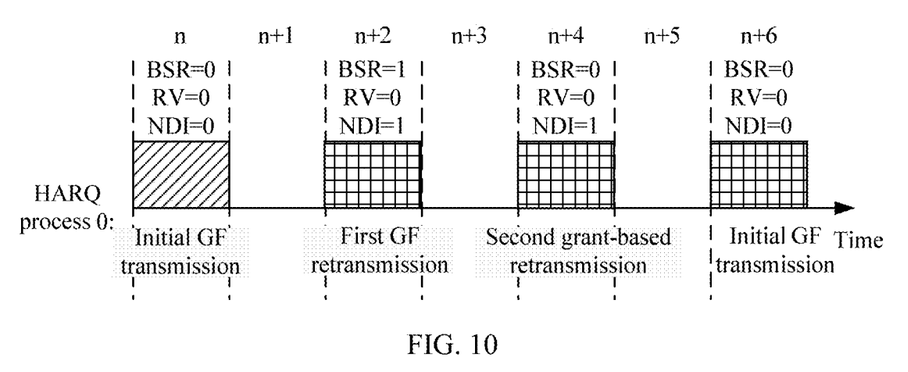
FIG. 10 is a schematic diagram of an uplink transmission method embodiment 4 according to an embodiment of the disclosure.

In a manner, different values assigned to the BSR indicate whether a data packet to be sent next time is transmitted by using a stored uplink transmission resource (namely, grant-free transmission) or is transmitted by using an uplink transmission resource allocated by a network side device as re-requested (namely, grant-based transmission). As shown in FIG. 10, the terminal performs initial GF transmission in an $n^{th}$ slot, and in this case, BSR=0 indicates that if there is retransmission, the retransmission is still GF transmission; the terminal performs first time of GF retransmission in an $(n+2)^{th}$ slot, and in this case, BSR=1 indicates that if there is retransmission, the retransmission is grant-based transmission; the terminal performs second time of grant-based retransmission in an $(n+4)^{th}$ slot, and in this case, BSR=0 indicates that subsequent retransmission is GF transmission; and the terminal performs initial GF transmission in an $(n+6)^{th}$ slot.

In another implementation, a value 1 assigned to the BSR represents that the data packet to be sent next time is transmitted by using the stored uplink transmission resource; and a value 0 assigned to the BSR indicates that the data packet to be sent next time is transmitted by using the uplink transmission resource allocated by the network side device as re-requested.

In still another implementation, when a value of the BSR is not toggled or is the same as a previous value, it indicates that the data packet to be sent next time is transmitted by using the stored uplink transmission resource; or when a value of the BSR is toggled or is not the same as a previous value, it indicates that the data packet to be sent next time is transmitted by using the uplink transmission resource allocated by the network side device as re-requested.

Figure 11:
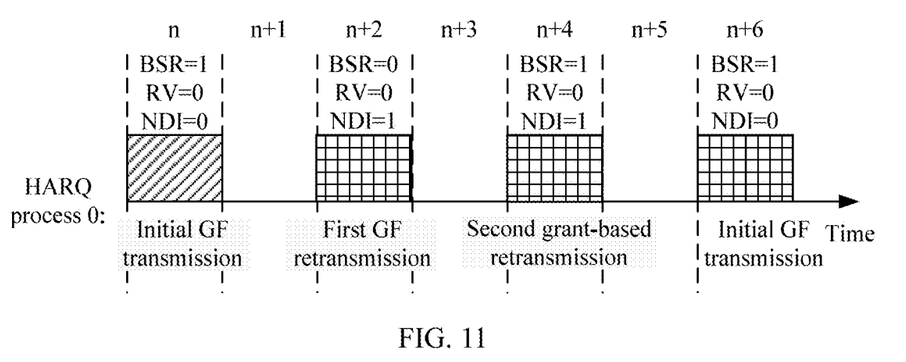
FIG. 11 is another schematic diagram of an uplink transmission method embodiment 4 according to an embodiment of the disclosure.

For example, when the value of the BSR is set to change to 1 from 0 or change to 0 from 1, it indicates that the data packet uses a transmission manner that is different from previous transmission; or when the value of the BSR does not change, it indicates that the data packet uses a transmission manner that is the same as previous transmission. As shown in FIG. 11, the terminal performs initial GF transmission in an $n^{th}$ slot, and in this case, BSR=1 indicates that if there is retransmission, the retransmission is still GF transmission; the terminal performs first time of GF retransmission in an $(n+2)^{th}$ slot, and in this case, the value of the BSR changes to 0 from 1, it indicates that if there is retransmission, the retransmission is grant-based transmission; the terminal performs second time of grant-based retransmission in an $(n+4)^{th}$ slot, and in this case, the value of the BSR changes to 1 from 0, it indicates that subsequent retransmission is GF transmission; and the terminal performs initial GF transmission in an $(n+6)^{th}$ slot.

Alternatively, different letters are used for the BSR to represent an initially transmitted data packet or a retransmitted data packet. For example, BSR=an indicates that a transmission manner of the data packet to be sent next time is still GF transmission, and BSR=b indicates that a transmission manner of the data packet to be sent next time changes to grant-based transmission. Such an indication manner is merely an example herein, and a manner of indicating grant-based transmission and GF transmission is not limited thereto in this embodiment of the disclosure.

According to Embodiment 4, the indication information carried in the control information includes the BSR, and the BSR indicates, to the base station, whether the terminal is switched to grant-based transmission, so that the base station can conveniently determine whether grant-based transmission needs to be performed. If a user data packet is large enough, grant-based transmission efficiency of the base station is high; or if a user data packet is not large enough, an overhead proportion of the control information is excessively large.

During specific implementation of Embodiment 1 to Embodiment 4, the control information is expressed as follows:

uplink control information (UCI), where the UCI may include the following information:
HARQ process ID—x bits
NDI—one bit or —RV—x bits In one embodiment, the UCI may further include the following information:
resource block assignment—x bits
BSR—x bits Embodiment 5

When a terminal performs uplink transmission to a base station, indication information is implicitly indicated by using a reference signal, and the indication information includes a HARQ process ID, to resolve a problem of how to combine a plurality of data packets by the base station when the plurality of data packets are simultaneously transmitted.

For a same terminal, different reference signals may be used to indicate different HARQ process IDs. A common reference signal is a ZC sequence:

$$x_q(n) = e^{-j\frac{\pi q n(n+1)}{N_{ZC}^{RS}}}, 0 \le n \le N_{ZC}^{RS} - 1,$$

where $N_{ZC}^{RS}$ represents a length of the ZC sequence, n represents an element number of the sequence, and q represents a root of the ZC sequence. Different roots correspond to different ZC sequences. The base station determines a corresponding process ID by detecting a sequence sent by the terminal.

In an implementation, different ZC sequences (whose roots are different) may be used to indicate different process IDs, for example:

$$\text{Process 0}: x_{q_0}(n) = e^{-j\frac{\pi q_0 n(n+1)}{N_{ZC}^{RS}}}$$

$$\text{Process 1}: x_{q_1}(n) = e^{-j\frac{\pi q_1 n(n+1)}{N_{ZC}^{RS}}}$$

In another implementation, different cyclic shifts may be performed on a same ZC sequence to generate different ZC sequences, to indicate different processes, for example:

$$r_0(n) = x_q(n) e^{-j\alpha_0 n} \qquad \text{Process 0:}$$

$$r_1(n) = x_q(n) e^{-j\alpha_1 n} \qquad \text{Process 1:}$$

Figure 12:
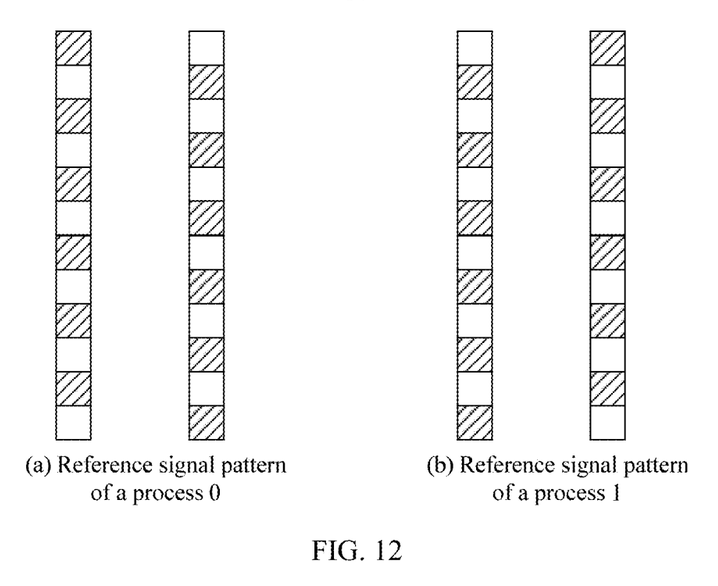
FIG. 12 is a schematic diagram of patterns of reference signals in uplink transmission method embodiments 5, 6, and 7 according to an embodiment of the disclosure.

In addition, different patterns (or locations) may be used to distinguishing between different processes. As shown in FIG. 12, two different reference signal patterns are respectively used to represent reference signals indicating a process 0 and a process 1. FIG. 12(*a*) and FIG. 12(*b*) correspond to different pilot locations, and a shaded part represents a location at which the reference signal is sent.

According to this embodiment of the disclosure, different reference signal sequences or patterns are used to indicate the indication information including the HARQ process ID and/or a redundancy version (RV), so that when receiving a data packet, the base station can accurately parse out a corresponding HARQ process ID from the data packet, and determine which data packet is an initially transmitted data packet and which data packet is a retransmitted data packet, to combine an initially transmitted data packet and a retransmitted data packet in a HARQ process corresponding to a same ID, thereby effectively improving a retransmission processing effect, and improving reliability of uplink transmission.

Embodiment 6

When a terminal performs uplink transmission to a base station, indication information is implicitly indicated by using a reference signal, and the indication information includes an NDI, to resolve a problem of how to determine an initially transmitted data packet and a retransmitted data packet in a same HARQ process.

Similar to Embodiment 5, for a same terminal, different reference signal sequences may be used to indicate the NDI, for example, different cyclic shifts of a ZC sequence, and different ZC sequences; or different reference signal locations or patterns may be used to distinguish between an initially transmitted data packet and a retransmitted data packet. As shown in FIG. 12, two different reference signal patterns respectively indicate an initially transmitted data packet and a retransmitted data packet. Details are not described herein.

According to Embodiment 6 in the disclosure, different reference signal sequences or patterns are used to implicitly indicate the indication information carrying a HARQ process ID, the NDI, and/or an RV, so that when receiving a data packet, the base station can accurately parse out a corresponding NDI from the data packet, and determine which data packet is an initially transmitted data packet and which data packet is a retransmitted data packet, to combine an initially transmitted data packet and a retransmitted data packet in a HARQ process corresponding to a same ID, thereby effectively improving a retransmission processing effect, and improving reliability of uplink transmission.

Embodiment 7

When a terminal performs uplink transmission to a base station, indication information is implicitly indicated by using a reference signal, and the indication information includes an RBA, to facilitate adaptive retransmission. Similar to Embodiment 5, for a same terminal, different reference signal sequences may be used to indicate different RBAs, for example, different cyclic shifts of a ZC sequence, and different ZC sequences; or different locations or patterns may be used to distinguishing between different RBA indicators. As shown in FIG. 12, two different reference signal patterns respectively indicate different RBAs. Details are not described herein.

According to Embodiment 7, the RBA is implicitly indicated by using the reference signal, and indicates, to the base station, a size and a location of a time-frequency resource used by a data packet currently sent by the terminal, so that the base station can conveniently determine, based on the size of the time-frequency resource (namely, a quantity of subbands), whether the currently transmitted data packet is a retransmitted data packet or an initially transmitted data packet, and receive the data packet at the indicated location of the time-frequency resource.

Embodiment 8

When a terminal performs uplink transmission to a base station, indication information is implicitly indicated by using a reference signal, the indication information includes a BSR, and the BSR is used to indicate, to the base station, whether the terminal is switched to grant-based transmission from GF transmission. Similar to Embodiment 5, for a same terminal, different reference signal sequences may be used to indicate the BSR, for example, different cyclic shifts of a ZC sequence, and different ZC sequences; or different locations or patterns may be used to distinguishing between different BSRs. As shown in FIG. 12, two different reference signal patterns respectively indicate different BSRs. Details are not described herein. The BSR is implicitly indicated by using the reference signal, and indicates, to the base station, whether the terminal is switched to grant-based transmission, so that the base station can conveniently determine whether grant-based transmission needs to be performed. If a user data packet is large enough, grant-based transmission efficiency of the base station is high, or if a user data packet is not large enough, an overhead proportion of control information is excessively large.

During specific implementation of Embodiment 5 to Embodiment 8, the indication information is implicitly indicated as follows by using the reference signal.

Different users use different demodulation reference signal sequences $r_{PUSCH}^{(\lambda)}(\cdot)$, $\lambda \in \{0, 1, \ldots, v-1\}$. A specific definition of the reference signal sequence is as follows:

$$r_{PUSCH}^{(\lambda)}(mM_{sc}^{RS}+n)=w^{(\lambda)}(m,n)r^{(\alpha_\lambda)}(n), \text{ where}$$

m=0 and m=1 respectively correspond to two OFDM symbols used for transmission of the reference signal, $n=0, \ldots, M_{sc}^{RS}-1$ corresponds to $M_{sc}^{RS}$ resource elements (Resource Element, RE) on each OFDM symbol, $r^{(\alpha_\lambda)}(n)$ indicates that a cyclic shift is performed on a basic sequence r(n), and r(n) may be the foregoing ZC sequence, or may be another sequence such as a Gold sequence.

In another implementation, patterns may be used to distinguish between different reference signals. For example, a sequence $w^{(\lambda)}(m, n)$ used for UCI 1a (having no NDI bit) is determined according to the following Table 2.

TABLE 2

| | (Patterns are used to distinguish between different reference signals) | |
|---|---|---|
| | $w^{(\lambda)}$ (m, n) | |
| NDI | (m + n) mod 2 = 0 | (m + n) mod 2 = 1 |
| 0 | [1 0] | [0 1] |
| 1 | [0 1] | [1 0] |

The foregoing table shows that, NDI=0 corresponds to a reference signal transmitted on an RE with an even number that is on a first OFDM symbol, an RE with an odd number is empty, and a case for a second OFDM symbol is on the contrary; and NDI=1 corresponds to a reference signal transmitted on an RE with an odd number that is on a first OFDM symbol, an RE with an even number is empty, and a case for a second OFDM symbol is on the contrary.

In still another implementation, a cyclic shift of a sequence may also be used to distinguish between pilots. A cyclic shift value $\alpha_\lambda$ is determined according to $\alpha_\lambda = 2\pi n_{cs,\lambda}/12$, and a value of $n_{cs,\lambda}$ is determined according to the following Table 3.

TABLE 3

(Cyclic shifts are used to distinguish between pilots)

| HARQ process ID | $n_{cs,\lambda}$ | |
|---|---|---|
| | $\lambda = 0$ | $\lambda = 1$ |
| 0 | 0 | 6 |
| 1 | 3 | 9 |

Table 3 shows that, when HARQ process ID=0, shift parameters are respectively 0 and 6; or when HARQ process ID=1, shift parameters are respectively 3 and 9.

The solutions in the embodiments of the disclosure are described above from perspectives of an overall environment and hardware apparatuses of a communications system, and method procedures. It may be understood that, to implement the foregoing functions, various network elements, for example, the terminal, the base station, or the control node, include a corresponding hardware structure and/or software module for performing each of the functions. A person skilled in the art should be easily aware that, in combination with example algorithm operations described in the embodiments disclosed in the disclosure, the disclosure can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the disclosure.

In the several embodiments provided in the disclosure, it should be understood that the disclosed apparatus and method may be implemented in other manners. For example, the described apparatus embodiment is merely an example. For example, the module or unit division is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed in different places. Some or all of the units may be selected based on actual requirements to achieve the objectives of the solutions of the embodiments.

In addition, functional units in the embodiments of the disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of the disclosure essentially, or the part contributing to the prior art, or all or some of the technical solutions may be implemented in the form of a software product. The software product is stored in a storage medium and includes several instructions for instructing a device (which may be a single-chip microcomputer, a chip, or the like) or a processor to perform all or some of the operations of the methods described in the embodiments of the disclosure. The foregoing storage medium includes: any medium that can store program code, such as a USB flash drive, a removable hard disk, a ROM, a RAM, a magnetic disk, or an optical disc.

The foregoing descriptions are merely specific implementations of the disclosure, but are not intended to limit the protection scope of the disclosure. Any variation or replacement readily figured out by a person skilled in the art within the technical scope disclosed in the disclosure shall fall within the protection scope of the disclosure. Therefore, the protection scope of the disclosure shall be subject to the protection scope of the claims.

What is claimed is:

1. An uplink transmission method, comprising:
receiving, by a network side device, a data packet sent by a terminal to the network side device by using a pre-allocated uplink transmission resource, wherein the data packet comprises indication information including a resource block assignment (RBA) indicator used to determine whether the data packet is initially transmitted by the terminal or the data packet is retransmitted by the terminal, wherein the RBA indicates a size and a location of a time-frequency resource; and
performing, by the network side device, combination processing on the data packet based on the indication information, wherein the network side device determines, based on a redundancy version (RV), a current quantity of retransmission times and whether the data packet is an initially transmitted data packet or a retransmitted data packet, and combines an initially transmitted data packet and a retransmitted data packet that are transmitted in a same hybrid automatic repeat request (HARQ) process;
wherein the indication information received by the transceiver is further used to indicate whether a data packet to be sent next time by the terminal is transmitted by using the pre-allocated uplink transmission resource or is transmitted by using an uplink transmission resource allocated by the network side device as re-requested;
wherein the indication information received by the transceiver is a buffer status report (BSR);
wherein the transceiver detects a data packet on an uplink transmission resource that is jointly used by an initially transmitted data packet and a retransmitted data packet, the data packet comprises control information, and the indication information is carried in the control information; and
then the network side device determines, based on a correspondence between a quantity of retransmission times and transmission bandwidth, transmission bandwidth corresponding to the current quantity of retransmission times.

2. A network side device, comprising:

a transceiver, configured to receive a data packet sent by a terminal to the network side device by using a pre-allocated uplink transmission resource, wherein the data packet comprises indication information including a resource block assignment (RBA) indicator used to determine whether the data packet is initially transmitted by the terminal or the data packet is retransmitted by the terminal, wherein the RBA indicates a size and a location of a time-frequency resource; and a processor, configured to:

perform combination processing on the data packet based on the indication information, determine, based on a redundancy version (RV), a current quantity of retransmission times and whether the data packet is an initially transmitted data packet or a retransmitted data packet, wherein the indication information received by the transceiver is further used to indicate whether a data packet to be sent next time by the terminal is transmitted by using the pre-allocated uplink transmission resource or is transmitted by using an uplink transmission resource allocated by the network side device as re-requested;

wherein the indication information received by the transceiver is a buffer status report (BSR);

wherein the transceiver detects a data packet on an uplink transmission resource that is jointly used by an initially transmitted data packet and a retransmitted data packet, the data packet comprises control information, and the indication information is carried in the control information, determine, based on a correspondence between a quantity of retransmission times and transmission bandwidth, transmission bandwidth corresponding to the current quantity of retransmission times, and combine an initially transmitted data packet and a retransmitted data packet that are transmitted in a same hybrid automatic repeat request (HARQ) process.

3. The network side device according to claim 2, wherein the indication information comprises one or more of the following parameters: HARQ process identity (ID), a new data indicator (NDI), and the redundancy version (RV).

4. The network side device according to claim 2, wherein the data packet comprises a reference signal, and the indication information received by the transceiver is carried in the reference signal.

5. The network side device according to claim 2, wherein the processor determines, based on a HARQ process ID, the HARQ process in which the terminal sends the data packet, and combines the initially transmitted data packet and the retransmitted data packet that are transmitted in the same HARQ process.

* * * * *